United States Patent [19]
Kraus

[11] Patent Number: 4,993,903
[45] Date of Patent: Feb. 19, 1991

[54] PLASTIC FASTENING ELEMENT WITH FLEXIBLE CENTERING STRAPS

[75] Inventor: Willibald Kraus, Grunstadt, Fed. Rep. of Germany

[73] Assignee: TRW United Carr GmbH & Co., Enkenbach-Alsenborn, Fed. Rep. of Germany

[21] Appl. No.: 437,253

[22] Filed: Nov. 16, 1989

[51] Int. Cl.⁵ .............................................. F16B 19/00
[52] U.S. Cl. ..................................... 411/510; 411/908; 411/913; 24/297
[58] Field of Search .............................. 411/508–510, 411/908, 913; 24/297, 453

[56] References Cited

U.S. PATENT DOCUMENTS

| | | | |
|---|---|---|---|
| 3,810,279 | 5/1974 | Swick et al. | 411/509 |
| 3,889,320 | 6/1975 | Koscik | 24/297 |
| 4,402,641 | 9/1983 | Arff | 411/510 |
| 4,489,465 | 12/1984 | Lemkin | 24/297 |
| 4,701,984 | 10/1987 | Wyckoff | 24/297 |
| 4,871,209 | 10/1989 | Handelman | 411/510 |

FOREIGN PATENT DOCUMENTS 66048  3/1969  Fed. Rep. of Germany ...... 411/510

Primary Examiner—Neill R. Wilson
Attorney, Agent, or Firm—Fay, Sharpe, Beall, Fagan, Minnich & McKee

[57] ABSTRACT

A plastic fastening element 1 for installation in a substantially rectangular opening of a support includes head part 2 and a holding part 3. Holding part 3 is substantially rectangular in cross section and is provided with lamella-form fingers 4 on the longer sides positioned in groups lying opposite each other. Stays (5) extend along the holding part 3 and limit the edge zone of the fingers. According to the invention, the stays are resilient straps 7 wherein the beginning zones 8 of the two straps 7 lie opposite each other on different sides of the holding part 3. The straps are arranged oblique to each other and merge into a conical push-in zone 23 with oblique side surfaces 24. The head part 3 is designed for holding a strip-form object.

17 Claims, 2 Drawing Sheets

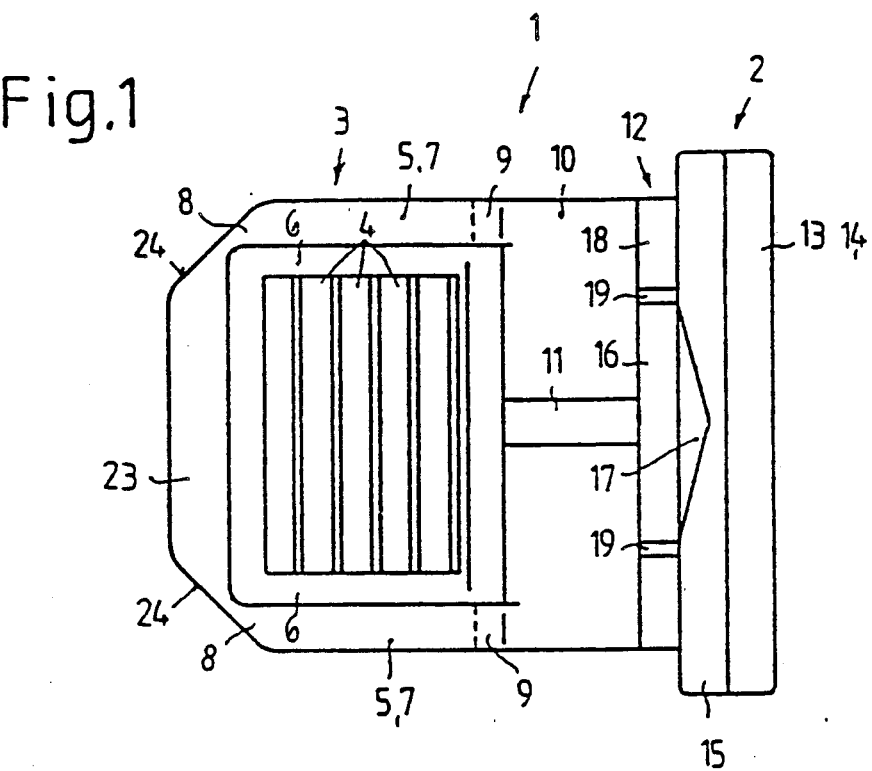
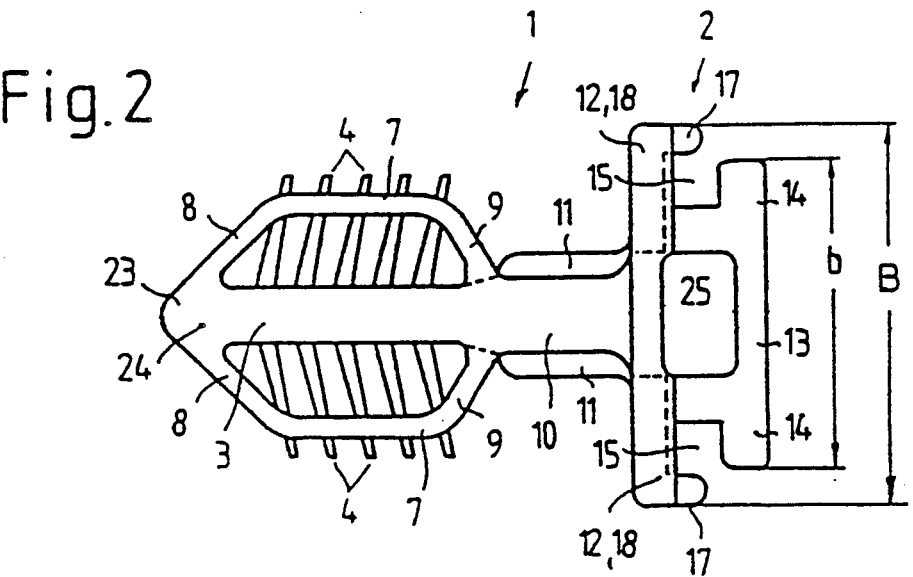

PLASTIC FASTENING ELEMENT WITH FLEXIBLE CENTERING STRAPS

BACKGROUND OF THE INVENTION

The subject invention relates to a plastic fastening element intended for installation in a substantially rectangular opening of a support frame or panel. The fastening element includes a head part with a holding portion of substantially rectangular cross section connected thereon. The holding portion includes lamella-form fingers or tabs on its longer sides lying opposite each other. In each case, the fingers are limited in the rim zone by a stay which extends along the holding part.

Already known as state of the art is a fastening element which is designed as a so-called self-centering pine-tree clip (see German Disclosure 3,014,745). As shown therein, there are stays which join directly against the head part and between the stays are lamella-form fingers which project obliquely upward. The problem to be solved was that the lamella-form fingers were to be stressed only within allowable limits while completely performing, however, their holding function.

In this prior fastening element the stays form a stiff, rigid unit, so that this element has only a very slight elasticity. It is thus not in a position, in practice, to compensate the tolerance variations occurring in setting into a rectangular opening of a support.

Also known in the prior art is a so-called plastic stopper which has flexible lamella standing out radially from a solid shaft core. The lamella are distributed over the circumference and are held together in axis-parallel groups (see German Disclosure 3,040,360). Here also, relatively exact dimensions must be held as to the rectangular opening in the support in order to set in this plastic stopper in a functionally secure manner.

Such fastening elements are sometimes used to hold functionally secure strip-form objects, such as decorative strips on motor vehicles. In such case, the correspondingly shaped head parts have lengthwise running zone into which the strips can be pushed sidewise (see German Published Application 2,739,889, German Utility Model 8,004,206, and German Disclosure 2,821,095).

The present invention attacks the problem of designing a fastening element of the kind mentioned, so that it can, even with major tolerance variations occurring in the dimensions of a substantially rectangular opening of a support, exert a secure holding function. While this fastening element is to serve mainly for the holding of the strip-form objects it can be used in other environments and for other purposes.

BRIEF DESCRIPTION OF THE INVENTION

This problem is solved, according to the subject invention, by the fact that the stays are designed as resilient straps with the beginning zones of two straps lying opposite each other on different sides of the holding part. The straps are arranged oblique to each other and pass into a conically shaped push-in zone with oblique side surfaces. Preferably, the head part is designed for holding a stripform object.

In this way, the advantage is given that as a result of the cooperation of the lamella-form fingers or tabs and the diagonally running resilient straps, the fastening element of the invention can be fastened perfectly into a substantially rectangular opening of a support. Indeed, secure fastening is achieved even when the substantially rectangular opening of the support lies within a large tolerance range. The fastening element according to the invention can thus advantageously be used for the holding of strip-form objects, especially in motor vehicles where these objects may, for example, be decorative strips.

In further a development of the invention, the end zones of the straps lying opposite each other may be mutually oblique and have the same wall thickness throughout. In this way, the elasticity is advantageously retained and the oblique ends of the straps lying opposite each other can be against the under side of the substantially rectangular opening of the support.

According to another feature of the invention there may be an intermediate zone between the lamella and straps of the holding part and the under side of the main part. The intermediate zone may substantially rectangular in cross section. Here, there may be arranged opposite each other on the longer sides of the intermediate zone lengthwise extending middle stays which provide an additional securing and stiffening of the intermediate zone.

According to another embodiment of the invention, the head part may be comprised of a base plate adjoining the intermediate zone and a closing plate in the shape of an inverted U arranged thereon. Extending out to the side are stays or ribs having a width which is preferably less than the width of the base plate. With this arrangement, a suitably shaped decorative strip may be placed, in a simple way, against the head part of the fastening element according to the invention. To improve the holding of such a strip, a further development of the invention contemplates that the base plate may have in its middle zone opposite the stays or ribs at least one resilient zone which has a projection, preferably triangular in form, directed toward the stays. This resilient projection presses against the corresponding zone of the strip-form object and thus improves its holding against the head part of the fastening element.

According to another feature of the invention, a gap may run between the side zone of the base plate and the resilient zone with the triangular projection. By this arrangement the necessary elasticity of the resilient zone is assured in a simple way.

According to another embodiment of the invention, the base plate may have a resilient zone with a triangular projection lying on both sides opposite the particular stays. This form of construction is of particular interest when the head part is arranged at right angles to the intermediate zone and the holding part.

As an alternative, it is also possible for the head part to lie at an oblique angle to the intermediate zone. Here, the base plate advantageously has only on the uppermost side the resilient zone with the triangular projection, while the lower side of the base plate may have in the middle zone, a resilient zone directed toward the underside of the neighboring stay. This prevents a possible wrong installation of a strip-form object, connected with the fastening element according to the invention, into a substantially rectangular opening of a support. Thus, in this way, an installation aid is provided. Resilient zones on both sides of the base plate may join the resilient tongues. Through this construction feature, the fastening element according to the invention can be placed perfectly against a strip-form object.

On the upper side of the closing plate of the head part, a lengthwise extending groove may be provided.

BRIEF DESCRIPTION OF THE DRAWINGS

The invention is described in detail below, with reference to the embodiments represented in the drawings wherein:

FIG. 1 is a frontal view of a fastening element formed according to the invention;

FIG. 2 is a side view of the fastening element according to FIG. 1;

DETAILED DESCRIPTION OF THE PREFERRED AND ALTERNATE EMBODIMENTS

Figure 3:
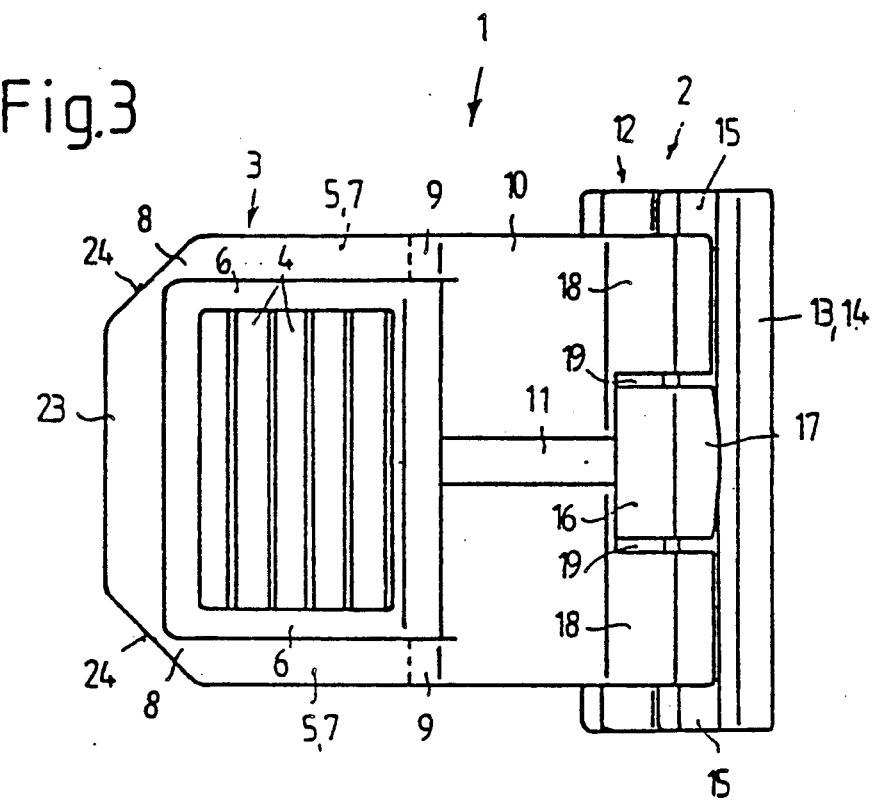
FIG. 3 is a frontal view of another embodiment of the fastening element.

Referring more particularly to the drawings wherein the showings are for the purpose of illustrating preferred embodiments only, and not for the purpose of limiting same, the fastening element 1 is best shown in FIGS. 1 and 2 and is formed of plastic and serves for installation into a substantially rectangular opening of a support. This fastening element has, as its main portions, a head part 2 and, connected thereon, a holding part 3 which is substantially rectangular in cross section. Lamella-form fingers or tabs are carried on the opposite long sides of the holding part 3. These fingers 4 are limited in their longitudinal extent or rim zone by stays 5 which extend along the holding part 3 at an intermediate distance 6 from the associated fingers. It is also possible to bring the fingers 4 up closely adjacent to the associated stay 5, so that the intermediate distance 6 is eliminated. The stays 5 act to provide centering and tolerance compensation for the fastening element. In addition, the stays 5 assure that the lamella-form fingers are in their most effective relationship relative to the support opening in which the fastening element is installed.

As can be seen, the stays 5 are designed in each case as resilient straps 7. According to FIG. 2, the straps 7 may have the same wall thickness throughout. According to the requirements of pressing-in or pulling out force, different wall thicknesses or varying wall thickness (e.g. conical) may be used. The beginning zones of the two straps 7 lie opposite each other on different sides of the holding part 3 and are, in this embodiment, arranged diagonal to each other. They merge into a conically arranged push-in zone 23 with oblique side surfaces 24. The end zones 9 of the resilient straps 7 lie opposite each other and are arranged oblique to each other. They may also lie, for example, against the under side of a support, not shown in detail.

From FIGS. 1 and 2 it can be seen that between the ridges 4 and straps 7 of the holding part 3 and the under side of the head part 2, lies an intermediate body portion 10, substantially rectangular in cross section. This intermediate body portion is so shaped in transverse cross section as to be fitted to a support opening of a predetermined size and shape. On the longer sides lying opposite each other of this intermediate body portion 10 there is arranged a lengthwise extending stay 11. There stay 11 is located in the middle of intermediate body portion 10 and is laid into the substantially perpendicular opening of a support, not shown in detail.

The head piece 2 is designed as a holding device for a strip-form object (not shown in detail), in particular, a decorative strip. For this purpose, the head part 2 consists of a base plate 12 which joins the intermediate zone, and an associated closing plate 13. Closing plate 13 is in the form of an inverted U with stays 14 arranged thereon and standing out laterally on both sides. From FIG. 2 it can be seen that the width b of the stays 14 is less than the width B of the base plate. Thus, a decorative strip, not shown in detail, can be clipped in from above, so that the corresponding legs can be caught into the interspaces 15 of the holding element according to FIG. 2. The legs might also be of any desired shape, so as to hold correspondingly shaped decorative strips or other objects.

To improve the holding of such a strip-form object on the fastening element 1 according to the invention, the base plate 12, according to FIGS. 1 and 2, may have in the middle zone lying opposite the stays 14, at least one resilient zone 16 with a projection 17 directed toward the stay 14. In this case, with the form of execution in FIGS. 1 and 2, the projection 17 is triangular. A convex design is also possible, according to tolerance and mounting requirements. To obtain in a simple way the elastic effect of the resilient zone 16 there is a gap 19 between the side zones 18 of the base plate 12 and the resilient zone 16. This assures that the resilient zone 16 will have the desired elasticity.

In the embodiment according to FIGS. 1 and 2, both sides of the base plate 12 have a resilient zone 16 with the triangular projection 17 lying opposite an associated stay 14. As can be seen, in the embodiment according to FIGS. 1 and 2, the head part 2 is arranged perpendicular to the intermediate zone 10 and the holding part 3, respectively. With this arrangement, the support (not shown in detail) and the decorative strip (also not shown in detail) lie substantially parallel and are connected with each other by the fastening element according to the invention and the holding part 2.

Figure 4:
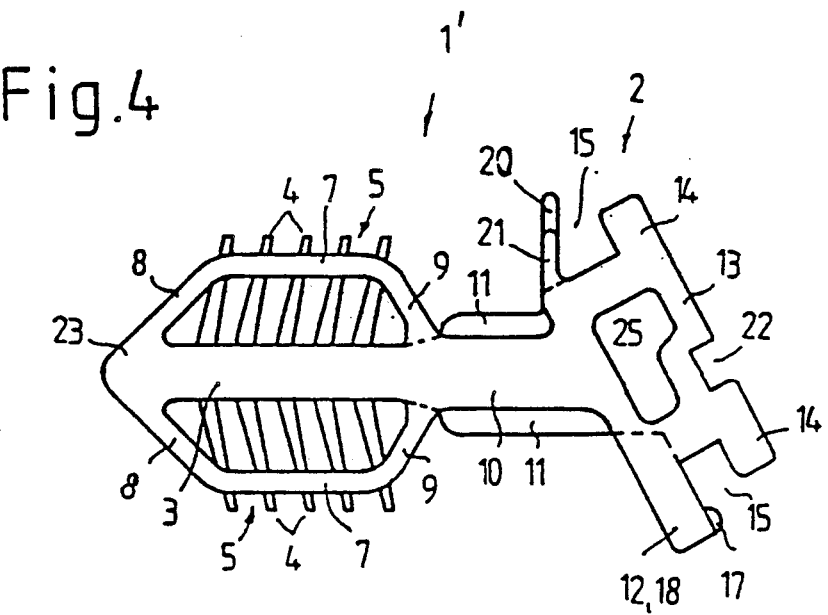
FIG. 4 is a side view of the fastening element of FIG. 3.

In the embodiment according to FIGS. 3 and 4, the fastening element 1' is so shaped that the head part 2 lies at an oblique angle with the intermediate body portion 10. In this way, a correspondingly formed decorative strip may also be fastened at an angle to a support. This fastening element 1', according to the invention, also has resilient straps 7. The two resilient straps 7 lie opposite each other on opposite sides of the holding part 3 and have their beginning zones 8 arranged oblique to each other as shown. The beginning zones 8 pass into a conical push-in zone 23 with oblique side surfaces 24. The straps 7 have the same wall thickness throughout, while the end zones 9 of the straps 7 lie opposite each other and are also arranged oblique to each other.

The holding part joins an intermediate body portion 10 which is rectangular in cross section and is provided on the long sides lying opposite each other with a lengthwise extending stay 11.

The head part 2 consists (as in FIGS. 1 and 2), of a base plate 12 adjoining the intermediate body portion 10. A closing plate 13 in the form of an inverted U is arranged thereon with stays 14 extending laterally. As in FIGS. 1 and 2, the width of the stays 14 is less than the width of the base plate.

In the embodiment according to FIGS. 3 and 4, the base plate 12 has only on the uppermost side a resilient zone 16 with a projection 17 which as shown in FIG. 3, for example, may be convex in shape. A gap 19 is provided between the resilient zone 16 and the adjoining zone of the base plate in order to assure, in a simple way, the spring effect of the resilient zone 16.

The under side of the base plate 12 is provided in the middle zone, according to FIG. 4, with a resilient tongue 20 which is directed against the under side of the neighboring stay 14, while resilient zones 21 of the base plate join on both sides the resilient tongue 20. Through this unsymmetrical shaping, with resilient tongue 20 on one side, and with resilient tongue 16 on the other side of the head part 2, there is assured a proper assembly with a decorative strip (not shown in detail). Through this special shaping, according to the invention, the decorative strip can only be joined in a very definite way with the fastening element 1. In this way, there is a proper installation of the fastening element into a substantially rectangular opening of a support (not shown in detail). In the embodiment of FIGS. 1 and 2, an interspace 25 is provided between the closing plate 13 and the base plate 12. This allows a certain elasticity to be obtained while also producing a savings in material. In the embodiment according to FIGS. 3 and 4, the closing plate 13 has a lengthwise groove 22 in the upper zone. The groove can be used for guiding and for proper installation of a decorative strip (not shown in detail). By special shaping of the interspace 15, there can also be attained a security against twisting, so that the groove 22 might be omitted.

Through the special design of the fastening element with the resilient straps 7 and the specially shaped head part, a construction is provided which makes it possible to mount a decorative strip on a motor vehicle, for example, in a substantially rectangular opening of a support, even when this opening has a rather great tolerance range. Through the special shaping of the head part, the corresponding decorative strip is placed in a functionally secure relationship against the fastening element. A wrong installation or a wrong connection with the decorative strip is perfectly prevented especially in the construction according to FIGS. 3 and 4.

What is claimed is:

1. A fastening element formed of plastic for installation into a substantially rectangular opening of a support member, said fastening element comprising: head part; a holding part having a substantially rectangular cross section joining said head part; lamella-form fingers on the longer sides of the holding part lying in groups opposite each other; stays (5) extending lengthwise of the holding part, said stays designed as resilient straps (7) having beginning zones (8) lying opposite each other on different sides of the holding part (3) and arranged diagonal to each other and merging into a push-in zone (23) having a conical configuration with oblique side surfaces (24), an intermediate body portion (10) adapted in cross section to the support opening positioned between the lamella-form fingers (4) and the head (2), the head part (2) comprising a base plate (12) adjoining the intermediate body portion (10) and a closing plate (13) arranged thereon in the form of an inverted U with laterally extending stays (14), the base plate (12) having at least one resilient zone (16) in the middle zone opposite the stays (14).

2. A fastening element according to claim 1 wherein the resilient zone (16) has a projection (17) lying opposite the stay (14).

3. A fastening element according to claim 2 wherein that the projection (17) is triangular in shape.

4. A fastening element according to claim 1 wherein there is a gap (19) between the side zones (18) of the base plate (12) and the resilient zone (16).

5. A fastening element according to claim 4 wherein the base plate (12) has, on both sides, lying opposite the respective stay (14), a resilient zone (16) with a projection (17).

6. A fastening element formed of plastic for installation into a substantially rectangular opening of a support member, said fastening element comprising: a head part; a holding part having a substantially rectangular cross section joining said head part; lamella-form fingers on the longer sides of the holding part lying in groups opposite each other; stays (5) extending lengthwise of the holding part, said stays comprising elongated resilient straps (7) each having longitudinally spaced first and second end portions joined to a central body section, said straps positioned in pairs lying opposite each other on different sides of the holding part (3), the first end portions of each pair of straps arranged diagonal to the first end portions of the other pair of straps and merging into a push-in zone (23) having a conical configuration with oblique side surfaces (24), each of said straps being joined to said holding part only at its said first and second end portions with said central body section spaced outwardly of the holding part.

7. A fastening element according to claim 6, wherein the straps (7) have oppositely positioned end zone portions (9) adjacent said first and second longitudinally spaced ends with said end zone portions arranged oblique to each other.

8. A fastening element according to claim 6 wherein the straps (7) have an equal wall thickness throughout their length.

9. A fastening element according to claim 6 including an intermediate body portion (10) between the lamella-form fingers and the head part (2) and wherein the head part (2) lies at an oblique angle to the intermediate body portion (10).

10. A fastening element according to claim 6 wherein an intermediate body portion (10) adapted in cross section to the support opening is positioned between the lamella-form fingers (4) and the head (2).

11. A fastening element according to claim 10 wherein the intermediate body portion (10) carries at least one stay (11) which extends lengthwise.

12. A fastening element according to claim 10 wherein the head part (2) comprises a base plate (12) the intermediate body portion (10) and a closing plate (13) arranged thereon in the form of an inverted U with laterally extending stays (14).

13. A fastening element according to claim 12 wherein the width b of the stay (14) is less than the width B of the base plate (12).

14. A fastening element formed of plastic for installation into a substantially rectangular opening of a support member, said fastening element comprising: a head part; a holding part having a substantially rectangular cross section joining said head part; lamella-form fingers on the longer sides of the holding part lying in groups opposite each other; stays (5) extending lengthwise of the holding part, said stays designed as resilient straps (7) having beginning zones (8) lying opposite each other on different sides of the holding part (3) and arranged diagonal to each other and merging into a push-in zone (23) having a conical configuration with oblique side surfaces (24), an intermediate body portion (10) positioned between the lamella-form fingers (4) and the head part (2), the head part (2) lying at an oblique angle to the intermediate body portion (10), said head part (2) further including a laterally extending stay (14)

and a base plate (12) having an under side which carries a resilient tongue (20) directed against the under side of said adjacent stay (14).

15. A fastening element according to claim 14 wherein the resilient tongue (20) is joined on both sides by resilient zones (21) of the base plate (12).

16. A fastening element formed of plastic for installation into a substantially rectangular opening of a support member, said fastening element comprising: a head part; a holding part having a substantially rectangular cross section joining said head part; lamella-form fingers on the longer sides of the holding part lying in groups opposite each other; stays (5) extending lengthwise of the holding part, said stays designed as resilient straps (7) having beginning zones (8) lying opposite each other on different sides of the holding part (3) and arranged diagonal to each other and merging into a push-in zone (23) having a conical configuration with oblique side surfaces (24), in intermediate body portion (10) positioned between the lamella-form fingers (4) and the head (2), the head part (2) lying at an oblique angle to the intermediate body portion (10), said head part further including a base plate (12) having on the uppermost side a resilient zone (16) with a triangular projection (17).

17. A fastening element formed of plastic for installation into a substantially rectangular opening of a support member, said fastening element comprising: a head part; a holding part having a substantially rectangular cross section joining said head part; lamella-form fingers on the longer sides of the holding part lying in groups opposite each other; stays (5) extending lengthwise of the holding part, said stays designed as resilient straps (7) having beginning zones (8) lying opposite each other on different sides of the holding part (3) and arranged diagonal to each other and merging into a push-in zone (23) having a conical configuration with oblique side surfaces (24,) an intermediate body portion (10) positioned between the lamella-form fingers (4) and the head part (2), the head part (2) lying at an oblique angle to the intermediate zone (10), and said head part including an elongated closing plate (13) having an upwardly open groove (22) extending lengthwise thereof.

* * * * *